United States Patent [19]

Yang

[11] Patent Number: 5,535,176
[45] Date of Patent: Jul. 9, 1996

[54] METHOD AND SYSTEM FOR SENSING WITH AN ACTIVE ACOUSTIC ARRAY

[75] Inventor: Tsih C. Yang, Great Falls, Va.

[73] Assignee: The United States of America as represented by the Secretary of the Navy, Washington, D.C.

[21] Appl. No.: 82,648

[22] Filed: Jun. 28, 1993

[51] Int. Cl.⁶ .......................... G06F 10/00; G01S 15/00; H04B 11/00
[52] U.S. Cl. ................... 367/13; 367/24; 367/61; 367/119; 73/1 DV
[58] Field of Search ................... 367/13, 24, 57, 367/61, 103, 119, 121–123, 127; 181/107, 111; 73/1 DV

[56] References Cited

U.S. PATENT DOCUMENTS

| | | |
|---|---|---|
| 3,489,994 | 1/1970 | Massa . |
| 3,614,719 | 10/1971 | Treacy . |
| 3,884,170 | 5/1975 | Jensen . |
| 4,107,684 | 8/1978 | Watson, Jr. . |
| 4,234,938 | 11/1980 | Grall .................... 367/105 |
| 4,234,939 | 11/1980 | Grall . |
| 4,300,653 | 11/1981 | Cao et al. .................. 181/107 |
| 4,468,760 | 8/1984 | Zalesak et al. ............... 367/13 |
| 4,510,586 | 4/1985 | Grall et al. . |
| 4,661,937 | 4/1987 | Groves . |
| 4,893,284 | 1/1989 | Mogrene ..................... 367/13 |
| 4,931,802 | 6/1990 | Assal et al. ................. 455/12 |
| 4,953,145 | 8/1990 | Carlson .................... 367/12 |
| 4,972,381 | 11/1990 | Mitchell et al. ............. 367/13 |
| 5,150,336 | 9/1992 | Sullivan et al. ............ 367/103 |
| 5,278,757 | 1/1994 | Hoctor et al. ............ 364/413.25 |

OTHER PUBLICATIONS

Albers, V. M., Underwater Acoustics Handbook–II, Penn. State Univ. Press, 1965, pp. 180–205.
Fricke et al, 50th Annu. Soc. Explor. Geophys. lett. Mfg., Nov. 16, 1980, Tech. pp. No. G–117, pp. 1727–50. Abstract only provided herewith.
Berg et al, Seismal. Soc. Am. Bull., vol. 66, #4, 1976, pp. 1413–1424; Abst. only herewith.
"A Method Of Range And Depth Estimation By Modal Decomposition", T. C. Yang, J. Acoust. S.c. Am. 82 (5), Nov. 1987, pp. 1736–1745.
"The Kraken Normal Mode Program", M. B. Porter, NRL/MR/5120–92–6920, May 1992.

*Primary Examiner*—Nelson Moskowitz
*Attorney, Agent, or Firm*—Thomas E. McDonnell; Charles J. Stockstill

[57] ABSTRACT

A method and system provide for the sensing of objects under water where the acoustic energy is suitably focused or directed so that reverberation returns are minimized. A vertical source array of adjustable acoustic sources is located in the water body, with each acoustic source producing a separate acoustic pulse or continuous wave controlled by a control device. The control device controls a phase and amplitude of the separate acoustic pulses such that a waveform (combined acoustic pulse) with selective nodes adjustable to a desired depth is emitted. A calibration device is also located at a distance from the source array for calibrating the separate acoustic pulses or continuous wave so that the source array emits a desired waveform. The calibration device includes a checking device for determining whether the emitted waveform conforms to the desired waveform and for calculating a deviation of the emitted waveform from the desired waveform. The calibration device also includes a feedback device for feeding deviation information back to the control device which further controls each acoustic source in accordance with the deviation information so that the desired waveform is produced. The control device controls the sources to generate continuous waves and/or combined pulses focused to a desired depth domain or a desired range-and-depth cell in the water body.

13 Claims, 1 Drawing Sheet

METHOD AND SYSTEM FOR SENSING WITH AN ACTIVE ACOUSTIC ARRAY

FIELD OF THE INVENTION

The present invention relates generally to an active acoustic array for sensing of an object under water, and more particularly to a method and system where the acoustic energy is suitably focused to a depth domain or to a range and depth cell so as to minimize reverberation returns.

1. Background of the Invention

Using conventional sources or source arrays, reverberation returns of an active acoustic source or array of sources from the ocean surface and bottom are typically sufficiently large that the return from the target or object is often cluttered and difficult to sense. These reverberations occur because a point source or a source array which is conventionally steered ensonifies the entire water column, including the surface and bottom which cause reverberation returns.

2. Summary of the Invention

It is an object of the present invention to provide an active source array having improved performance.

It is also an object of the present invention to direct the acoustic energy of the source array away from the ocean surface and bottom to reduce reverberations therefrom so that object sensing is maximized and made simpler.

It is a further object of the present invention to provide object returns which are less cluttered and hence are more clear, and which therefore contain more useful information such as for target classification.

In accordance with the present invention, a method and system provide for the sensing of objects under water where the acoustic energy is suitably focused or directed so that reverberation returns are minimized. A vertical source array of adjustable acoustic sources is located in the water body, with each acoustic source producing a separate acoustic pulse or continuous wave controlled by a control device. The control device controls a phase and amplitude of the separate acoustic pulses such that a waveform (combined acoustic pulse) with selective nodes adjustable to a desired depth is emitted.

A calibration device is also located at a distance from the source array for calibrating the separate acoustic pulses or continuous wave so that the source array emits a desired waveform. The calibration device includes a checking device for determining whether the emitted waveform conforms to the desired waveform and for calculating a deviation of the emitted waveform from the desired waveform. The calibration device also includes a feedback device for feeding deviation information back to the control device which further controls each acoustic source in accordance with the deviation information so that the desired waveform is produced. The control device controls the sources to generate continuous waves and/or combined pulses focused to a desired depth domain or a desired range-and-depth cell in the water body.

It is an advantage of the present invention that a combined acoustic pulse can be focused to the operation depths of the underwater object with reverberations from the ocean surface and bottom reduced significantly compared with conventional sources or source arrays.

It is also an advantage of the present invention that a combined acoustic pulse can be directed/confined to a domain of range and depth to search for a potential target.

It is a further advantage that the level of a return from any target will be increased due to the focus of the combined acoustic pulse on the target.

Other features, objects and advantages of the present invention are stated in or apparent from detailed descriptions of presently preferred embodiments of the invention found hereinbelow.

DETAILED DESCRIPTION OF THE PREFERRED EMBODIMENTS

Figure 1:
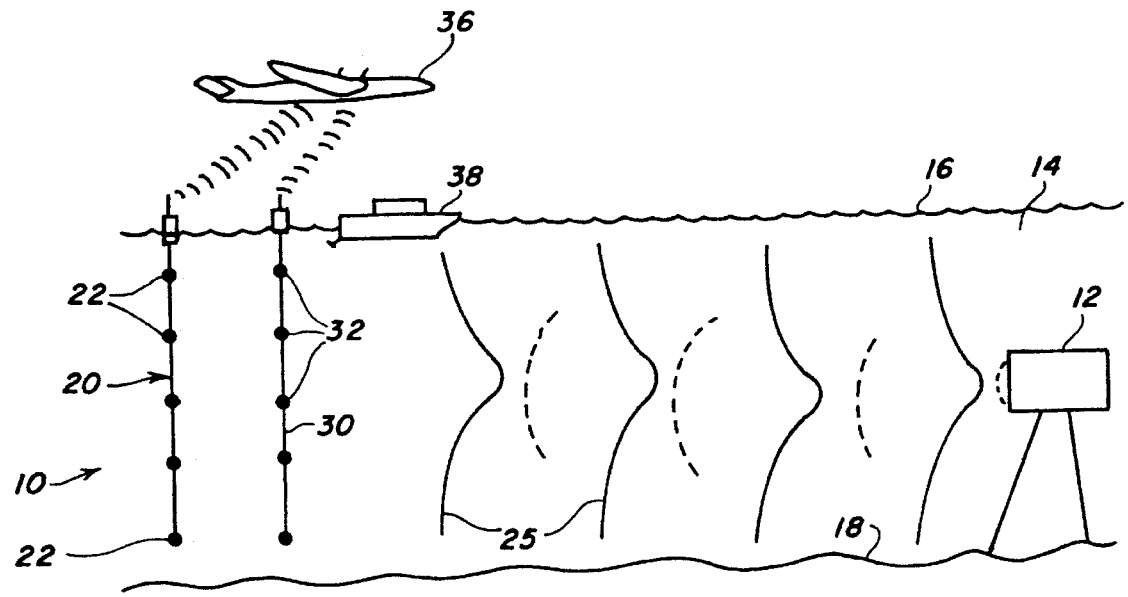
FIG. 1 is a schematic representation in elevation of an active acoustic array system of the present invention producing continuous combined acoustic pulses or continuous wave.
Figure 2:
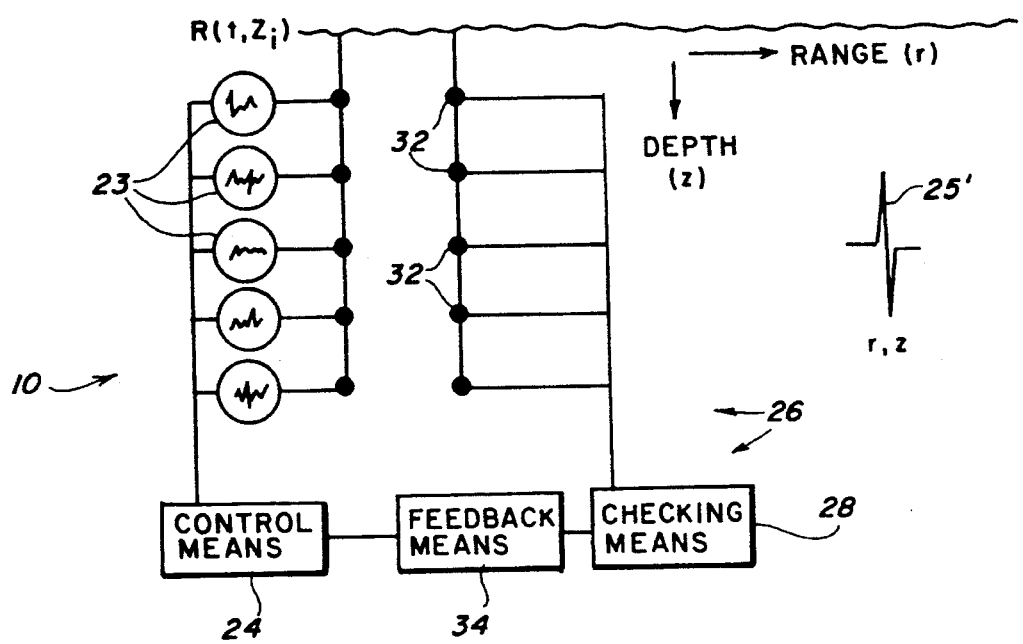
FIG. 2 is a schematic representation in greater detail of the array system depicted in FIG. 1 which is instead producing a combined acoustic pulse directed to a particular range-and-depth cell.

With reference now to the drawings in which like numerals represent like elements throughout the views, FIGS. 1 and 2 depict an active acoustic array system 10 for looking for and hence for sensing an underwater object 12 in a water body 14. It will be appreciated that water body 14 includes a surface 16 and a bottom 18. Disposed in water body 14 is a vertical source array 20. Source array 20 includes a plurality of acoustic sources 22 strung together. Each acoustic source 22 is capable of producing a separate acoustic pulse 23, as schematically illustrated in FIG. 2. Such acoustic sources 22 are well known in the art, and suitable sources 22 would be the HLF series sources manufactured by Hydroacoustics, Inc of Rochester, N.Y. The spacings between acoustic sources 22 is about ½ of a wavelength of the center frequency to be produced by all of acoustic sources 22 (as continuous pulses or discrete pulses as discussed below).

Each acoustic source 22 is controlled by a control means 24. Control means 24 controls the separate acoustic pulse 23 generated by each acoustic source 22 as shown in FIG. 2. Each control means 24 can be located with acoustic sources 22 or remotely therefrom if desired. Control means 24 is used to control the waveform or acoustic pulse produced by the associated acoustic source 22. The initial acoustic pulses to be produced by acoustic sources 22 is calculated and then set in the associated control means 24 according to the best available information on the environmental acoustic condition of the waveguide (water body 14) and the structure of bottom 18.

The combination of all of the separate acoustic pulses 23 is a combined acoustic pulse 25, which is desired to match a predetermined combined acoustic pulse. While acoustic sources 22 are depicted as emitting a two dimensional combined acoustic signal 25, the separate acoustic pulses 23 and their combined acoustic pulse 25 would be emitted in three dimensions. Of course, some steering in the horizontal azimuth of the acoustic pulses could be achieved as known in the art or when the source array has a horizontal aperture.

In order to actually produce exactly the predetermined "desired" combined acoustic pulse (having a desired phase and amplitude) from source array 20, a calibration means 26 is located at a distance from source array 20 on the order of one to tens of kilometers. Calibration means 26 is utilized to calibrate the separate acoustic pulses 23 emitted by the acoustic sources 22 of source array 20 so that combined acoustic pulse 25 matches the desired combined acoustic pulse. To accomplish this, calibration means 26 includes a checking means 28 having an associated receiver array 30. Checking means 28 is used for signal conditioning and then checking (i.e., comparing and determining differences, if any) whether the emitted combined acoustic pulse 25 from source array 20 detected by receiver array 30 conforms to the desired combined acoustic pulse. Receiver array 30 includes stringed acoustic receivers 32 which each receive a different combined acoustic pulse portion from source array 20 due to the different positions (depths) of acoustic receivers 32. While receivers 32 are similar in nature to acoustic sources 22, receivers 32 will be different in size with slightly larger receivers 32 needed to best detect longer wavelengths.

Calibration means 26 also includes a feedback means 34 for calculating any deviation of the received combined acoustic pulse portion at each acoustic receiver 32 from the desired combined acoustic pulse portion which should be received, and for feeding deviation information back to control means 24. Control means 24 then controls each acoustic source 22 further in accordance with the deviation information received so that the emitted combined acoustic pulse 25 passing receiver array 30 matches the desired combined acoustic pulse. Once the emitted combined acoustic pulse matches the desired combined acoustic pulse, calibration means 26 is not used further and may be removed (picked up for later reuse) or used at a later date to again make sure that the emitted combined acoustic pulse matches the desired combined acoustic pulse.

Calibration means 26 is used in situ in order to correct for various items which inherently prevent the initially emitted combined acoustic pulse from actually matching the desired combined acoustic pulse. Such items include the non-uniformities of source hardware and electronics as well as acoustic source position errors and differences in pressure at each acoustic source depth. Where low frequencies are used, it is anticipated a minimum of calibration will be required; while for high frequencies a greater calibration requirement will be needed.

While the transmission of deviation information is depicted in FIG. 1 as being transmitted by radio between receiver array 30 and source array 20 via an airplane 36, such information could also be transmitted directly or through other means such as ship 38. For the depicted embodiment, airplane 36 would be used to deploy both arrays 20 and 30 as part of a search operation. Alternatively or additionally, ship 38 could deploy one or both of arrays 20 and 30 and search in conjunction with other nearby ships or planes. Both source array 20 and receiver array 30 could also be retrieved by ship 38 when a search operation was completed, or abandoned and left in place (to drift) if desired. It would also be possible to anchor array 20 in place for permanent monitoring at the site, with occasional checks on the operation of source array 20 made with a temporarily positioned receiver array 30 (such as temporarily positioned by helicopter).

With system 10, two different focusing schemes of the combined acoustic pulse can be achieved. Depicted in FIG. 1 is a first one of the schemes, where a continuous combined acoustic pulse has been focused to a depth domain where it is expected to find underwater object 2, which can be at any range (determined by conditions) so long as the return signal is detectable. This continuous combined acoustic pulse is produced by controlling the phase and amplitude of each continuous separate acoustic pulse emitted at each acoustic source 22. The amplitude and phase are adjusted so that a single or a combination of normal modes are generated.

With such a continuous combined acoustic pulse, the combined acoustic pulse 25 detected at receiver array 30, or rather the portions of the continuous combined acoustic pulse detected at each acoustic receiver 32, will be compared with the desired combined acoustic pulse portions appropriate for the corresponding depth of acoustic receivers 32. The relative acoustic intensity at each acoustic receiver 32 will not vary depending on the distance of receiver array 30 from source array 20, as shown in FIG. 1.

Since the acoustic energy of normal modes are confined to a certain depth domain, it is thus possible to design the acoustic energy distribution to the depth domain desired. How well the acoustic energy is confined to a chosen depth domain depends on the properties of the wave guide (water body 14), the array source design, and how well acoustic sources 24 can be controlled in practice. Preferably, only one mode will be generated as this is simpler and easier to send and receive. However, if more modes than one are generated by source array 22, which is usually the case if source array 22 is short, then the emitted sound intensity shows a periodic dependence in range and depth due to modal interferences. Thus, for a shallow water waveguide, all modes are bottom interacting and reverberation from the bottom can only be minimized for selected ranges.

A critical element of system 10 is calibration means 26 which is used to monitor the combined acoustic pulse emitted by source array 20 and to provide feedback for adjusting acoustic sources 22. Receiver array 30 should thus have an aperture corresponding to the depth span (height of waveguide) of the (highest) emitting modes if possible. In the Arctic, the first mode would be the desired mode. Thus, given the aperture of the first mode at the desired frequency, the number of acoustic receivers 32 would be determined by dividing the aperture by the half wavelength of the combined acoustic pulse — so that the normal spacing of the receivers would be ½ wavelength, just like that of acoustic sources 22.

If system 0 is used with the second focusing scheme as depicted in FIG. 2 in a broadband mode, source array 20 is used to "focus" the combined acoustic pulse emitted into a compressed acoustic pulse 25' (amplitude peak) at a particular range-and-depth cell (compression point at r,z) as depicted in FIG. 2. This compressed acoustic pulse is the combination of all of the separate acoustic pulses 23 at the desired range and depth. Thus, the compressed acoustic pulse produced at this point as some particular signal or waveform is not otherwise produced elsewhere.

Target searching with the second focusing scheme would then be accomplished by emitting different separate acoustic pulses from acoustic sources 22 to produce desired compressed acoustic pulses 25' corresponding to different range-and-depth cells over the volume to be searched. Such an operation provides, in effect, the equivalent of an acoustic radar. By confining the combined acoustic pulse to a domain of water column occupied by the (anticipated) target, the energy is more focused and the return from the target (if any) will be more intensive than with an unfocused combined acoustic pulse.

With such a focused or compressed acoustic pulse 25, the combined acoustic pulse detected at receiver array 30, or rather the portions or the continuous wave signal detected at each acoustic receiver 32, will have to be compared with desired wave signal portions appropriate not only for the corresponding depth of acoustic receivers 32 but as well for the corresponding distance from source array 20. This is because the particular combined acoustic pulse portions received by each acoustic receiver 32 will vary depending on the distance of receiver array 30 from source array 20 even though depth remains the same. While this complicates the proper calibration of acoustic sources 22, this does permit the range-and-depth cell to be located between source array 22 and receiver array 32 as calibration means 26 can perform the needed calibration with a combined acoustic pulse after focusing as well as before focusing.

In order to provide system 10 with a combined acoustic pulse emitted by source array 20 which is focused to specific range-and-depth cells, a computer with a broadband propagating code is required. In system 10, this computer is provided as part of control means 24. The combined acoustic pulse is calculated by taking the desired combined acoustic pulse to be received at the range-and-depth cell and propagating from that position to the source array. The consequently calculated combined acoustic pulse is then time reversed and used as the combined acoustic pulse to be emitted by source array 20. This technique is equivalent to the technique in optics called "phase conjugate". The only difference in the two techniques is that in the acoustic version the normal modes are often severely attenuated by the wave guide as contrasted with the small attenuation which occurs in optics for comparable ranges.

With the present invention, this phase conjugate technique uses a calculation for the combined acoustic pulse using a "virtual" propagation code. The combined acoustic pulse is calculated from the range-and-depth cell to source array 20 with "negative" mode attenuation such that the combined acoustic pulse is actually amplified in the propagation code contained in the computer of control means 24. This amplification is used to compensate for mode attenuation in the real ocean when the combined acoustic pulse travels from source array 20 to the range-and-depth cell where a potential target is to be searched for.

In general, this technique is performed as follows. Initially, the range and depth (r,z) where the combined acoustic pulse is to be focused is initially inputted to the computer, with the desired combined (compressed) acoustic pulse $S(t)$ to be received at (r,z). The pulse $S(t)$ is then Fourier transformed into spectral components $S(\omega)$. Each narrow band component $S(\omega)$ from position (r,z) is then propagated to a position of each element of source array 20 using a suitable propagation code (such as the normal mode code called KRAKEN— M. B. Porter, *The KRAKEN Normal Mode Program*, NRL/MR/5120-92-6920, May 22, 1992 which is herein incorporated by reference) as a received signal denoted $R(\omega,Z_i)$. It will be appreciated that the acoustic environment used in the propagation code must correspond to the environment in which system 10 is to be used. However, instead of attenuating the signal as normally done in optics, the signal will be amplified by using negative attenuation for the dominant modes (virtual waveguide). Thus, the signal $R(\omega,Z_i)$ at depth $Z_i$ is then complex conjugated and Fourier transformed into $R(t,Z_i)$. $R(t,Z_i)$ is the combined acoustic pulse to be broadcasted from the acoustic source 22 at depth $Z_i$. Of course, when calibration means 26 is used, the same procedure is used to determine the desired combined acoustic pulse (or pulse portions) to be detected at receiver array 30.

Experiments have been conducted to monitor data at less than 30 Hz using a vertical source array having a 1000 meter aperture (waveguide) with an average 30 meter spacing between acoustic sources 22. Acoustic sources 22 were used to provide a continuous combined acoustic pulse, and the data was sampled at 344 Hz and low passed filtered at 100 Hz. It was found that there was below the expected differences in sound distribution with the present invention.

The comparison was made using a display of range and depth distribution using the same acoustic power for the associated sources with all sources located in the same sound channel. Two different sources were used as a base and compared with system 10 of the present invention operating according to the first scheme to produce a continuous wave (CW) combined acoustic pulse. The first base was a point source at 60 meters emitting a CW acoustic pulse of 25 Hz, while the second base was a line array of ten sources spaced at 30 meters starting at 30 meters below the surface, with the sources steered broadside to the array. It was found that with both the point source and the line array, the entire water column was ensonified. Then, using the same line array as the second base, but with the sources emitting primarily in the first mode (and with the sources weighted in phase and amplitude according to the first mode), it was found that the acoustic energy reaching the bottom was much suppressed so that reverberations were similarly suppressed. In particular, it was found that reverberation from the bottom was less by 10–30 dB and that reverberation from the surface was also suppressed.

When operating in the broadband mode, system 10 is used to focus the combined acoustic pulse to a specified range-and-depth cell. By emitting different waveforms for different range-and-depth cells, what is in effect an "acoustic radar" is generated. System 10 thus provides in hardware the equivalent of pulse compression using the ocean as a match filter, hence significantly reducing the source level required to achieve the same received level compared with a conventional design. Using a conventional source in bistatic active mode, the area (between source and receiver) covered by direct blast paths constitute a blind area in which active sensing does not work. However, by focusing the combined acoustic pulse to a range-and-depth cell, the power of the direct blast is significantly reduced.

By knowing what normal modes are being generated by source array 20 and then interacting with a target, the return from the target will provide useful information to classify the target. This is possible because the acoustic scattering of a normal mode with a target is deterministic and can be investigated a priori. In particular, different classes of underwater objects produce unique returns, and the returns of one class in general will be different from other classes.

System 10 has been depicted as including a single receiver array 30. However, it would be possible to have more than one receiver array if a double-checking of the combined acoustic pulse were desired or if conditions at different locations away from the source array were different and required a different calibration when searching in that direction. It would also be possible to remove the calibration means after initially calibrating source array 20 as the conditions would not be expected to change very rapidly (typically only over a number of weeks or more) in a water body 14 to require re-calibration. However, should re-calibration be required (which can be determined from other instruments normally associated with system 10), re-calibration is possible simply by redeploying calibration means 26.

While the present invention has been described as useful for underwater sensing, the broadband operation scheme is obviously very effective at focusing a plurality of disparate sources to a desired range-and-depth cell with a compressed combined acoustic pulse which is otherwise not present (and not detectable as such) at any other position. As a result of this, it is also possible for system 10 to be used for communications with an underwater object or the like located at a particular range-and-depth cell. Communication would be effected by pulsing the compressed acoustic pulses directed to the underwater object in a predetermined coded sequence, after location of the underwater object by system 10 or by locating the underwater object at a predetermined range-and-depth cell from source array 22.

Both arrays 20 and 30 have been depicted as being attached to a suitable buoy when placed in the water body 14. However, it will be appreciated that once in place, either or both source array 20 and receiver array 30 can be anchored in place or left to drift (as depicted). In either event, it is possible for the arrays to be displaced from a vertical orientation to some angular orientation. If this angular orientation is known or determinable, suitable compensation can be provided in calibration means 26 as necessary for searching in a particular direction or in all directions.

System 10 has been depicted as being left in place to perform the sensing. However, it would also be possible to provide system 10 for use with a hovering aircraft to make system 10 temporary and immediately transportable (movable at will) as desired for acoustic sensing. Such a use would require an initial calibration, which would be expected to be sufficient for uses in any search vicinity of a water body without any recalibration. It will also be appreciated that where deployed from a ship, or when used in the vicinity of ships, system 10 would be operated at a frequency so as not to be interfered with by dominant noise from the ships.

While the present invention has been described with respect to exemplary embodiments thereof, it will be understood by those of ordinary skill in the art that variations and modifications can be effected within the scope and spirit of the invention.

What is claimed is:

1. An active acoustic array system for sensing objects under the surface of a water body comprising:
   a vertical source array of adjustable acoustic sources located in the water body, each said acoustic source producing a separate acoustic pulse;
   a control means for controlling a phase and amplitude of the separate acoustic pulse generated by each said source such that a combined acoustic pulse with selective nodes focused to a desired depth or a desired range-and-depth cell is emitted from said source array; and
   a calibration means located at a distance from said source array for calibrating the separate acoustic pulses emitted by said sources of said source array so that said source array emits a desired combined acoustic pulse, said calibration means including (a) a checking means for checking whether the emitted combined acoustic pulse from said source array conforms to the desired combined acoustic pulse and for calculating a deviation of the emitted combined acoustic pulse from the desired combined acoustic pulse and (b) a feedback means for feeding deviation information back to said control means which further controls each said acoustic source in accordance with the deviation information so that the desired combined acoustic pulse is produced by said source array.

2. A system as claimed in claim 1 wherein said control means controls said sources to generate only a single mode combined acoustic pulse.

3. A system as claimed in claim 1 wherein said control means controls said sources to generate a combination of normal modes of the combined acoustic pulse.

4. A system as claimed in claim 1 wherein said control means controls said sources to generate continuous combined acoustic pulses focused to a desired depth domain of the water body.

5. A system as claimed in claim 1 wherein said control means controls said sources to generate a combined acoustic pulse focused to the desired range-and-depth cell in the water body.

6. A system as claimed in claim 5 wherein said control means includes a computer means for determining the separate acoustic pulses for each said acoustic source to emit in order to generate a combined acoustic pulse focused to a desired range-and-depth cell, said computer means including (a) a broadband propagating code and (b) a calculating means for calculating the desired combined acoustic pulse to be received at the range-and-depth cell, for propagating the desired combined acoustic pulse from the range-and-depth cell to said source array using said propagating code, and for time reversing the propagated combined acoustic pulse which is then emitted by said source array.

7. A system as claimed in claim 1 further including a means for pulsing the compressed acoustic pulses in a predetermined coded sequence.

8. A method for producing acoustic pulses for sensing objects under the surface of a water body comprising:
   deploying a vertical source array of adjustable acoustic sources in the water body;
   producing a separate acoustic pulse with each acoustic source;
   controlling a phase and amplitude of the separate acoustic pulse generated by each source with a control means such that a combined acoustic pulse with selective nodes focused to a desired depth is emitted from the source array; and
   locating at a distance from the source array a calibration means for calibrating the separate acoustic pulses emitted by the sources of the source array so that the source array emits a desired combined acoustic pulse; and
   calibrating the separate acoustic pulses emitted by the sources of the source array so that the source array emits a desired combined acoustic pulse, said calibrating step including the steps of (a) checking whether the emitted combined acoustic pulse from the source array conforms to the desired combined acoustic pulse, (b) calculating a deviation of the emitted combined acoustic pulse from the desired combined acoustic pulse and (c) feeding deviation information back to the control means to control each acoustic source in accordance with the deviation information so that the desired combined acoustic pulse is produced by the source array.

9. A method for producing pulses as claimed in claim 8 wherein the controlling step includes the controlling of the sources to generate only a single mode combined acoustic pulse.

10. A method for producing pulses as claimed in claim 8 wherein the controlling step includes the controlling of the sources to generate a combination of normal modes of the combined acoustic pulse.

11. A method for producing pulses as claimed in claim 8 wherein controlling step includes the controlling of the sources to generate continuous combined acoustic pulses focused to a desired depth domain of the water body.

12. A method for producing pulses as claimed in claim 8 wherein controlling step includes the controlling of the sources to generate a combined acoustic pulse focused to a desired range-and-depth cell in the water body.

13. A method for producing pulses as claimed in claim 8 wherein the control means includes a computer means for calculating having a broadband code; and wherein said controlling step includes the steps of determining the separate acoustic pulses for each acoustic source to emit in order to generate a combined acoustic pulse focused to a desired range-and-depth cell with the computer means, calculating the desired combined acoustic pulse to be received at the range-and-depth cell with the computer means, propagating the desired combined acoustic pulse from the range-and-depth cell to the source array using the propagating code of the computer means, and time reversing the propagated combined acoustic pulse so that the desired combined acoustic pulse is then emitted by the source array.

* * * * *